United States Patent
Ko et al.

(10) Patent No.: US 11,312,871 B2
(45) Date of Patent: Apr. 26, 2022

(54) SEPARATOR FOR SECONDARY BATTERY AND LITHIUM SECONDARY BATTERY COMPRISING SAME

(71) Applicant: SAMSUNG SDI CO., LTD., Yongin-si (KR)

(72) Inventors: Changhong Ko, Yongin-si (KR); Dongwan Seo, Yongin-si (KR); Hyeonsun Choi, Yongin-si (KR); Ickkyu Choi, Yongin-si (KR); Jungjoon Park, Yongin-si (KR); Jinkyu Park, Yongin-si (KR); Sam-Jin Park, Yongin-si (KR); Yangseob Kim, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 226 days.

(21) Appl. No.: 16/603,649

(22) PCT Filed: May 15, 2018

(86) PCT No.: PCT/KR2018/005568
§ 371 (c)(1),
(2) Date: Oct. 8, 2019

(87) PCT Pub. No.: WO2018/212566
PCT Pub. Date: Nov. 22, 2018

(65) Prior Publication Data
US 2020/0119323 A1    Apr. 16, 2020

(30) Foreign Application Priority Data
May 17, 2017    (KR) .................. 10-2017-0061284

(51) Int. Cl.
*H01M 50/446* (2021.01)
*H01M 50/449* (2021.01)
(Continued)

(52) U.S. Cl.
CPC ............... *C09D 7/61* (2018.01); *C08J 7/043* (2020.01); *C08J 7/0427* (2020.01); *C08K 3/22* (2013.01);
(Continued)

(58) Field of Classification Search
CPC .... C09D 7/61; C09D 5/20; C08J 7/043; C08J 7/0427; H01M 50/44; H01M 50/403;
(Continued)

(56) References Cited

U.S. PATENT DOCUMENTS 4,574,110 A    3/1986    Asano et al.
8,492,021 B2    7/2013    Kaun
(Continued)

FOREIGN PATENT DOCUMENTS

AU    2002314302 B2    12/2002
CN    1328102 A        12/2001
(Continued)

OTHER PUBLICATIONS

USPTO Office action dated Apr. 13, 2021, in U.S. Appl. No. 15/596,258.
(Continued)

*Primary Examiner* — Bethany L Martin
*Assistant Examiner* — Kourtney R S Carlson
(74) *Attorney, Agent, or Firm* — Lee IP Law, P.C.

(57) ABSTRACT

The present invention relates to a separator for a secondary battery and a lithium secondary battery including the separator, the separator including: a porous substrate and a heat-resistant layer disposed on at least one surface of the porous substrate, wherein the heat-resistant layer includes an acrylic heat-resistant binder, an adhering binder, and a filler, the acrylic heat-resistant binder including a structural unit derived from (meth)acrylate or (meth)acrylic acid, a cyano group-containing structural unit, and a sulfonate group-
(Continued)

containing structural unit, the adhering binder includes a structural unit including a structural unit including hydroxyl group, a structural unit including an acetate group, and a structural unit including an alkali metal.

12 Claims, 2 Drawing Sheets

(51) Int. Cl.
```
       H01M 50/42        (2021.01)
       H01M 50/417       (2021.01)
       H01M 10/0525      (2010.01)
       C09D 7/61         (2018.01)
       C08J 7/04         (2020.01)
       H01M 50/44        (2021.01)
       H01M 50/403       (2021.01)
       H01M 50/411       (2021.01)
       H01M 50/429       (2021.01)
       C08J 7/043        (2020.01)
       C08K 3/22         (2006.01)
       C09D 5/18         (2006.01)
       C09D 133/20       (2006.01)
       H01M 4/131        (2010.01)
       H01M 4/133        (2010.01)
       H01M 4/505        (2010.01)
       H01M 4/525        (2010.01)
       H01M 4/62         (2006.01)
       H01M 4/66         (2006.01)
       H01M 10/052       (2010.01)
       H01M 50/46        (2021.01)
       H01M 4/02         (2006.01)
```

(52) U.S. Cl.
CPC .............. *C09D 5/18* (2013.01); *C09D 133/20* (2013.01); *H01M 4/131* (2013.01); *H01M 4/133* (2013.01); *H01M 4/505* (2013.01); *H01M 4/525* (2013.01); *H01M 4/623* (2013.01); *H01M 4/624* (2013.01); *H01M 4/661* (2013.01); *H01M 10/0525* (2013.01); *H01M 50/403* (2021.01); *H01M 50/411* (2021.01); *H01M 50/417* (2021.01); *H01M 50/42* (2021.01); *H01M 50/4295* (2021.01); *H01M 50/44* (2021.01); *H01M 50/446* (2021.01); *H01M 50/449* (2021.01); *C08J 2323/06* (2013.01); *C08J 2433/20* (2013.01); *C08K 2003/2227* (2013.01); *H01M 10/052* (2013.01); *H01M 50/461* (2021.01); *H01M 2004/027* (2013.01); *H01M 2004/028* (2013.01)

(58) Field of Classification Search
CPC .............. H01M 50/411; H01M 50/446; H01M 50/449; H01M 50/4295; H01M 50/461; H01M 50/443; H01M 50/414; H01M 50/42; H01M 50/40; H01M 4/131; H01M 4/133; H01M 4/505; H01M 4/525; H01M 4/623; H01M 4/624; H01M 4/661; H01M 10/0525; H01M 10/052; H01M 50/417; C08K 3/22; Y02E 60/10
USPC ......................................................... 429/129
See application file for complete search history.

(56) References Cited

U.S. PATENT DOCUMENTS

| | | | |
|---|---|---|---|
| 10,205,147 | B2 | 2/2019 | Park et al. |
| 2004/0171014 | A1 | 9/2004 | Smith |
| 2011/0027642 | A1 | 2/2011 | Lee et al. |
| 2011/0081601 | A1 | 4/2011 | Weber et al. |
| 2011/0159362 | A1 | 6/2011 | Wakizaki et al. |
| 2013/0017429 | A1 | 1/2013 | Ha et al. |
| 2013/0171499 | A1 | 7/2013 | Yang et al. |
| 2013/0252066 | A1 | 9/2013 | Yeou et al. |
| 2013/0302661 | A1 | 11/2013 | Kim et al. |
| 2013/0330590 | A1 | 12/2013 | Toyoda |
| 2014/0030578 | A1 | 1/2014 | Hoshiba et al. |
| 2014/0045033 | A1* | 2/2014 | Zhang ............... H01M 50/449 429/145 |
| 2014/0107275 | A1 | 4/2014 | Uemura |
| 2014/0186680 | A1* | 7/2014 | Kim .................. H01M 50/411 429/144 |
| 2015/0140402 | A1 | 5/2015 | Kim et al. |
| 2015/0263325 | A1 | 9/2015 | Honda et al. |
| 2016/0013465 | A1 | 1/2016 | Akiike |
| 2016/0149190 | A1 | 5/2016 | Fukuchi |
| 2016/0164059 | A1 | 6/2016 | Hong et al. |
| 2016/0190536 | A1 | 6/2016 | Park et al. |
| 2016/0233475 | A1 | 8/2016 | Son et al. |
| 2016/0351873 | A1 | 12/2016 | Sasaki |
| 2017/0133654 | A1 | 5/2017 | Cho et al. |
| 2017/0338461 | A1 | 11/2017 | Seo et al. |

FOREIGN PATENT DOCUMENTS

| | | | |
|---|---|---|---|
| CN | 101641808 | A | 2/2010 |
| CN | 101946344 | A | 1/2011 |
| CN | 102015083 | A | 4/2011 |
| CN | 102640329 | A | 8/2012 |
| CN | 103325975 | A | 9/2013 |
| CN | 103390740 | A | 11/2013 |
| CN | 104521028 | A | 4/2015 |
| CN | 104521031 | A | 4/2015 |
| CN | 105018001 | A | 11/2015 |
| CN | 105027325 | A | 11/2015 |
| CN | 105637677 | A | 6/2016 |
| JP | H02-063788 | | 3/1990 |
| JP | H06-172725 | A | 6/1994 |
| JP | WO2010-024328 | A1 | 3/2010 |
| JP | 2011-108444 | | 6/2011 |
| JP | WO2012/011555 | A1 | 1/2012 |
| JP | WO2012/029805 | A1 | 3/2012 |
| JP | 2012-099324 | A | 5/2012 |
| JP | 5148142 | B2 | 2/2013 |
| JP | WO2013/125645 | A1 | 8/2013 |
| JP | 5323590 | B2 | 10/2013 |
| JP | 2014-149935 | A | 8/2014 |
| JP | 2014-175055 | A | 9/2014 |
| JP | 5601472 | B2 | 10/2014 |
| JP | 2014-225410 | A | 12/2014 |
| JP | 2014-229427 | A | 12/2014 |
| JP | 5647378 | B2 | 12/2014 |
| JP | 2015-088253 | A | 5/2015 |
| JP | 2015-115321 | A | 6/2015 |
| JP | 2015-118908 | A | 6/2015 |
| JP | 2015-162312 | A | 9/2015 |
| JP | 2015-185353 | A | 10/2015 |
| JP | 2015-536030 | A | 12/2015 |
| JP | 5844950 | B2 | 1/2016 |
| JP | 2016-062689 | A | 4/2016 |
| JP | 5920441 | B2 | 4/2016 |
| JP | 2016-105398 | A | 6/2016 |
| JP | 2016-216550 | A | 12/2016 |
| KR | 10-2012-0097238 | A | 9/2012 |
| KR | 10-1187767 | B1 | 10/2012 |
| KR | 10-1247248 | B1 | 3/2013 |
| KR | 10-2013-0035215 | | 4/2013 |
| KR | 10-1301595 | B1 | 8/2013 |
| KR | 10-2013-0107550 | A | 10/2013 |
| KR | 10-2014-0003404 | A | 1/2014 |
| KR | 10-2014-0004156 | A | 1/2014 |
| KR | 10-1365300 | B1 | 2/2014 |
| KR | 10-2014-0044757 | A | 4/2014 |
| KR | 10-1453785 | B1 | 10/2014 |
| KR | 10-1470696 | B1 | 12/2014 |
| KR | 10-2015-0042216 | A | 4/2015 |
| KR | 10-2015-0043703 | | 4/2015 |

(56) References Cited

FOREIGN PATENT DOCUMENTS

| KR | 10-2015-0057481 A | 5/2015 |
|---|---|---|
| KR | 10-1529758 B1 | 6/2015 |
| KR | 10-2015-0084116 A | 7/2015 |
| KR | 10-2015-0106811 A | 9/2015 |
| KR | 10-1551757 B1 | 9/2015 |
| KR | 10-2016-0051199 A | 5/2016 |
| KR | 10-2016-0069431 A | 6/2016 |
| KR | 10-2016-0072162 A | 6/2016 |
| KR | 10-2016-0115599 A | 10/2016 |
| KR | 10-2017-0053448 A | 5/2017 |
| WO | WO 2014/148577 A1 | 9/2014 |
| WO | WO 2014-148577 A1 | 9/2014 |
| WO | WO 2017-033431 A1 | 3/2017 |

OTHER PUBLICATIONS

U.S. Office action issued in U.S. Appl. No. 16/100,099 dated Dec. 12, 2019.
U.S. Office action issued in U.S. Appl. No. 16/100,099 dated Sep. 11, 2020.
U.S. Office action issued in U.S. Appl. No. 16/100,099 dated Mar. 19, 2021.
U.S. 15/596,258, filed May 16, 2017.
U.S. 15/982,380, filed May 17, 2018.
International Search Report for PCT/KR2018/005568 filed on May 15, 2018.
U.S. Office action dated Sep. 28, 2020, in U.S. Appl. No. 15/596,258.
Chinese Office action dated Sep. 27, 2020 and Search Report dated Sep. 16, 2020.
Chinese Search Report dated Oct. 16, 2019 and Office action dated Oct. 24, 2019 for corresponding Chinese Patent Application No. 201710347234.7.
Nicolas Fedelich, "Application Handbook Thermal Analysis of Polymers Selected Applications Thermal Analysis", Jan. 1, 2013, XP055608279, Retrieved from the Internet.
European Search Report dated Jan. 22, 2021.
U.S. Office action dated Jul. 10, 2020, in U.S. Appl. No. 15/596,258.
USPTO Office action dated Mar. 18, 2019 and Oct. 3, 2019, in U.S. Appl. No. 15/596,258.
Japanese Notice of Allowance dated Nov. 2, 2020.
Chinese Office action dated Apr. 6, 2021.
Chinese Office action dated Jun. 19, 2020.
U.S. Office action in co pending related U.S. Appl. No. 16/100,099 dated Jul. 16, 2021.
Japanese Office action dated Jun. 1, 2021.
USPTO Office action dated Jan. 3, 2020, in U.S. Appl. No. 15/982,380.
USPTO Office action dated Jan. 10, 2020, in U.S. Appl. No. 15/596,258.
U.S. Office Action received in Copending U.S. Appl. No. 15/596,258 dated Nov. 9, 2021.
Chinese Office action dated Sep. 17, 2021.
U.S. Office action receiving in co-pending U.S. Appl. No. 16/100,099.

* cited by examiner

[Figure 1]
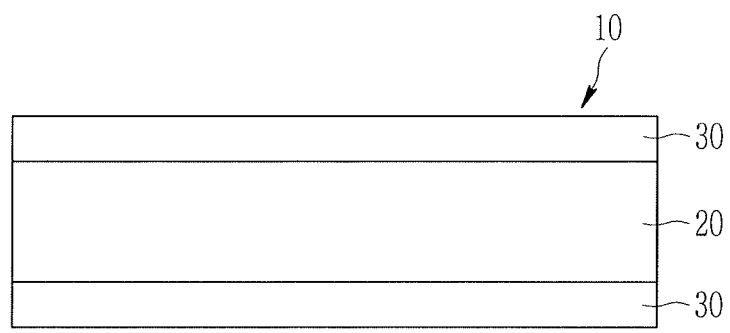

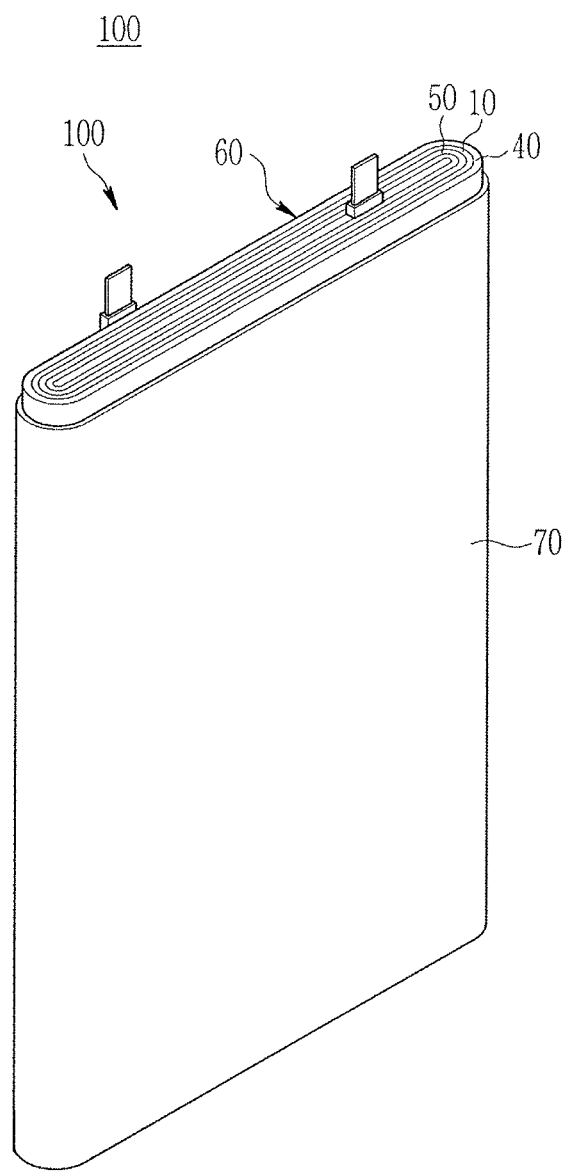
[Figure 2]

SEPARATOR FOR SECONDARY BATTERY AND LITHIUM SECONDARY BATTERY COMPRISING SAME

CROSS-REFERENCE TO THE RELATED APPLICATION

This is the U.S. national phase application based on PCT Application No. PCT/KR2018/005568, filed May 15, 2018, which is based on Korean Patent Application No. 10-2017-0061284, filed May 17, 2017, the entire contents of all of which are hereby incorporated by reference.

TECHNICAL FIELD

A separator for a secondary battery and a lithium secondary battery including the same are related.

BACKGROUND ART

A separator for an electrochemical battery is an intermediate film that separates a positive electrode and a negative electrode in a battery, and maintains ion conductivity continuously to enable charge and discharge of a battery. When a battery is exposed to a high temperature environment due to abnormal behavior, a separator may be mechanically shrinks or is damaged due to melting characteristics at a low temperature. Herein, the positive and negative electrodes contact each other and may cause an explosion of the battery. In order to overcome this problem, technology of suppressing shrinkage of a separator and ensuring stability is required.

For example, a method of increasing thermal resistance of the separator by coating the separator with a mixture of inorganic particles having a large thermal resistance and an organic binder having adherence is well known. However, this conventional method may not sufficiently secure desired adherence and not uniformly applied to variously-sized separators.

Accordingly, a separator having high heat resistance and excellent adherence needs to be developed.

DISCLOSURE

Technical Problem

A separator for a secondary battery having high heat resistance and strong adherence is provided and a lithium secondary battery has improved heat resistance, stability, cycle-life characteristics, rate capability, oxidation resistance, and the like.

Technical Solution

In an embodiment, a separator for a secondary battery includes a porous substrate and a heat-resistant layer disposed on at least one surface of the porous substrate, wherein the heat-resistant layer includes an acrylic heat-resistant binder, an adhering binder, and a filler, the acrylic heat-resistant binder includes a structural unit derived from (meth)acrylate or (meth)acrylic acid, a cyano group-containing structural unit, and a sulfonate group-containing structural unit and the adhering binder includes a structural unit including a structural unit including hydroxyl group, a structural unit including an acetate group, and a structural unit including an alkali metal.

In another embodiment, a lithium secondary battery includes a positive electrode, a negative electrode, and the separator for a secondary battery disposed between the positive electrode and the negative electrode.

Advantageous Effects

The separator for a secondary battery according to an embodiment has improved heat resistance and adherence, and thus a lithium secondary battery including the same has improved heat resistance, stability, cycle-life characteristics, rate capability, and oxidation resistance.

DESCRIPTION OF THE DRAWINGS

FIG. 1 is a cross-sectional view showing a separator for a secondary battery according to an embodiment.

FIG. 2 is an exploded perspective view showing a lithium secondary battery according to an embodiment.

DESCRIPTION OF SYMBOLS

10: separator
20: porous substrate
30: heat-resistant layer
40: positive electrode
50: negative electrode
60: electrode assembly
70: case

BEST MODE

Hereinafter, embodiments of the present invention are described in detail. However, these embodiments are exemplary, the present invention is not limited thereto and the present invention is defined by the scope of claims.

Hereinafter, as used herein, when a definition is not otherwise provided "substituted" refers to replacement of hydrogen of a compound by a substituent selected from a C1 to C30 alkyl group, a C2 to C30 alkenyl group, a C2 to C30 alkynyl group, a C6 to C30 aryl group, a C7 to C30 alkylaryl group, a C1 to C30 alkoxy group, a C1 to C30 heteroalkyl group, a C3 to C30 heteroalkylaryl group, a C3 to C30 cycloalkyl group, a C3 to C15 cycloalkenyl group, a C6 to C30 cycloalkynyl group, a C2 to C30 heterocycloalkyl group, a halogen (F, Cl, Br, or I), a hydroxy group (—OH), a nitro group (—NO$_2$), a cyano group (—CN), an amino group (—NRR', wherein, wherein R and R' are each independently hydrogen or a C1 to C6 alkyl group), a sulfo-betaine group (—RR'N$^+$(CH$_2$)$_n$SO$_3^-$), a carboxyl betaine group (—RR'N$^+$(CH$_2$)$_n$COO$^-$, wherein, R and R' are each independently a C1 to C20 alkyl group), an azido group (—N$_3$), an amidino group (—C(=NH)NH$_2$), a hydrazino group (—NHNH$_2$), a hydrazono group (=N(NH$_2$), a carbamoyl group (—C(O)NH$_2$), a thiol group (—SH), an acyl group (—C(=O)R, wherein R is hydrogen, a C1 to C6 alkyl group, a C1 to C6 alkoxy group, or a C6 to C12 aryl group), a carboxyl group (—COOH) or a salt thereof (—C(=O)OM, wherein M is an organic or inorganic cation), a sulfonic acid group (—SO$_3$H), or a salt thereof (—SO$_3$M, wherein M is an organic or inorganic cation), a phosphoric acid group (—PO$_3$H$_2$) or a salt thereof (—PO$_3$MH or —PO$_3$M$_2$, wherein M is an organic or inorganic cation), and a combination thereof.

Hereinafter, a C1 to C3 alkyl group may be a methyl group, an ethyl group, or a propyl group. A C1 to C10 alkylene group may be for example a C1 to C6 alkylene group, a C1 to C5 alkylene group, or a C1 to C3 alkylene group, and may be for example a methylene group, an ethylene group, or a propylene group. A C3 to C20 cycloalkylene group may be for example a C3 to C10 cycloalkylene group, or a C5 to C10 alkylene group, and may be for example a cyclohexylene group. A C6 to C20 arylene group may be for example a C6 to C10 arylene group and may be for example a phenylene group. A C3 to C20 heterocyclic group may be for example a C3 to C10 heterocyclic group and may be for example a pyridine group.

Hereinafter, "hetero" refers to one including at least one heteroatom selected from N, O, S, Si, and P.

Hereinafter, "combination thereof" refers to a mixture, a copolymer, a blend, an alloy, a composite, a reaction product of components.

In addition, in chemical formula, "*" refers to a point of attachment to an atom, a group, or a structural unit that may be the same or different.

Hereinafter, "an alkali metal" refers to an element of Group 1 of Periodic Table 1, lithium, sodium, potassium, rubidium, cesium, or francium and may be present in a cation state or neutral state.

Hereinafter, a separator for a secondary battery according to an embodiment is described. FIG. 1 is a view showing a separator for a secondary battery according to an embodiment. Referring to FIG. 1, a separator 10 for a secondary battery according to an embodiment includes a porous substrate 20 and a heat-resistant layer 30 disposed on one surface or both surfaces of the porous substrate 20.

The porous substrate 20 may have a plurality of pore and may generally be a porous substrate used in an electrochemical device. Non-limiting examples of the porous substrate 20 may be a polymer film formed of a polymer, or a copolymer or a mixture of two or more selected from polyolefin such as polyethylene, polypropylene, and the like, a polyester such as polyethylene terephthalate, polybutylene terephthalate, and the like, polyacetal, polyamide, polyimide, polycarbonate, polyetheretherketone, polyaryletherketone, polyetherimide, polyamideimide, polybenzimidazole, polyether sulfone, a polyphenylene oxide, a cyclic olefin copolymer, polyphenylene sulfide, polyethylene naphthalate, a glass fiber, Teflon, and polytetrafluoroethylene.

The porous substrate 20 may be for example a polyolefin-based substrate, and the polyolefin-based substrate may improve has safety of a battery due to its improved shut-down function. The polyolefin-based substrate may be for example selected from a polyethylene single film, a polypropylene single film, a polyethylene/polypropylene double film, a polypropylene/polyethylene/polypropylene triple film, and a polyethylene/polypropylene/polyethylene triple film. In addition, the polyolefin-based resin may include a non-olefin resin in addition to an olefin resin or a copolymer of olefin and a non-olefin monomer.

The porous substrate 20 may have a thickness of about 1 μm to 40 μm, for example 1 μm to 30 μm, 1 μm to 20 μm, 5 μm to 15 μm, or 10 μm to 15 μm.

The heat-resistant layer 30 includes an acrylic heat-resistant binder, an adhering binder, and a filler.

The acrylic heat-resistant binder includes a structural unit derived from (meth)acrylate or (meth)acrylic acid, a cyano group-containing structural unit, and a sulfonate group-containing structural unit. The acrylic heat-resistant binder may play a role of fixing the filler on the porous substrate 20, and may simultaneously provide an adhesion force to adhere the heat-resistant layer 30 on the porous substrate 20 and the electrode, and may contribute improvement of heat resistance, air permeability, and oxidation resistance of the separator 10.

In the structural unit derived from (meth)acrylate or (meth)acrylic acid, the (meth)acrylate may be a conjugate base of a (meth)acrylic acid, a (meth)acrylate salt, or a derivative thereof. The structural unit derived from (meth)acrylate or (meth)acrylic acid may be for example represented by Chemical Formula 1, Chemical Formula 2, Chemical Formula 3, or a combination thereof.

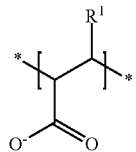

[Chemical Formula 1]

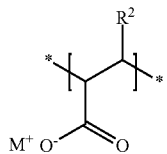

[Chemical Formula 2]

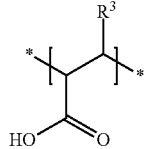

[Chemical Formula 3]

In Chemical Formula 1 to Chemical Formula 3, $R^1$, $R^2$, and $R^3$ are independently hydrogen or a methyl group, In Chemical Formula 2, M is an alkali metal.

The alkali metal may be for example lithium, sodium, potassium, rubidium, or cesium.

The structural unit derived from (meth)acrylate or (meth)acrylic acid may be included in an amount of 10 mol % to 70 mol %, for example 20 mol % to 60 mol %, for example 30 mol % to 60 mol %, for example 40 mol % to 55 mol % based on a total amount of the acrylic heat-resistant binder. When the structural unit derived from (meth) acrylate or (meth) acrylic acid is included in the ranges, the acrylic heat-resistant binder and separator 10 including the same may exhibit excellent adherence, heat resistance, air permeability, and oxidation resistance.

For example, the structural unit derived from (meth) acrylate or (meth)acrylic acid may include a structural unit represented by Chemical Formula 2 and a structural unit represented by Chemical Formula 3 and the structural unit represented by Chemical Formula 2 and the structural unit represented by Chemical Formula 3 may be included in a mole ratio of 10:1 to 1:2, 10:1 to 1:1, or 5:1 to 1:1.

The cyano group-containing structural unit may be for example represented by Chemical Formula 4.

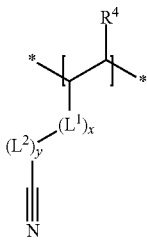

[Chemical Formula 4]

In Chemical Formula 4, $R^4$ is hydrogen or a C1 to C3 alkyl group, $L^1$ is —C(=O)—, —C(=O)O—, —OC(=O)—, —O—, or —C(=O)NH—, x is an integer ranging from 0 to 2, $L^2$ is a substituted or unsubstituted C1 to C10 alkylene group, a substituted or unsubstituted C3 to C20 cycloalkylene group, a substituted or unsubstituted C6 to C20 arylene group or a substituted or unsubstituted C3 to C20 heterocyclic group, and y is an integer ranging from 0 to 2.

The cyano group-containing structural unit may be for example a structural unit derived from (meth)acrylonitrile, alkenenitrile, cyanoalkyl(meth)acrylate, or 2-(vinyloxy)alkanenitrile. Herein, the alkene may be C1 to C20 alkene, C1 to C10 alkene, or C1 to C6 alkene, the alkyl may be C1 to C20 alkyl, C1 to C10 alkyl, or C1 to C6 alkyl, and the alkane may be C1 to C20 alkane, C1 to C10 alkane, or C1 to C6 alkane.

The alkene nitrile may be for example allyl cyanide, 4-pentene nitrile, 3-pentene nitrile, 2-pentene nitrile, or 5-hexene nitrile, and the like. The cyanoalkyl(meth)acrylate may be for example cyanomethyl(meth)acrylate, cyanoethyl (meth)acrylate, cyanopropyl(meth)acrylate, or cyanooctyl (meth)acrylate. The 2-(vinyloxy)alkanenitrile may be for example 2-(vinyloxy)ethane nitrile, or 2-(vinyloxy)propane nitrile.

The cyano group-containing structural unit may be included in an amount of 30 mol % to 85 mol %, for example 30 mol % to 70 mol %, for example 30 mol % to 60 mol %, for example 35 mol % to 55 mol % based on a total amount of the acrylic heat-resistant binder. When the cyano group-containing structural unit is included within the ranges, the acrylic heat-resistant binder and the separator 10 including the same may ensure excellent oxidation resistance and exhibit adherence, heat resistance, and air permeability.

The sulfonate group-containing structural unit may be a structural unit including a conjugate base of a sulfonic acid, a sulfonate salt, a sulfonic acid, or a derivative thereof. For example, the sulfonate group-containing structural unit may be represented by Chemical Formula 5, Chemical Formula 6, Chemical Formula 7, or a combination thereof.

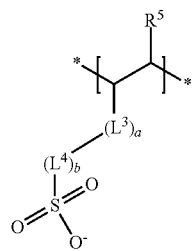

[Chemical Formula 5]

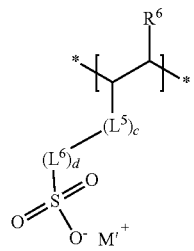

[Chemical Formula 6]

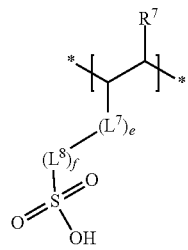

[Chemical Formula 7]

In Chemical Formula 5 to Chemical Formula 7, $R^5$, $R^6$, and $R^7$ are each independently hydrogen or a C1 to C3 alkyl group, $L^3$, $L^5$, and $L^7$ are each independently —C(=O)—, —C(=O)O—, —OC(=O)—, —O—, or —C(=O)NH—, $L^4$, $L^6$, and $L^8$ are each independently substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, a, b, c, d, e, and f are each independently an integer ranging from 0 to 2, in Chemical Formula 6, M' is an alkali metal.

For example, in Chemical Formula 5 to Chemical Formula 7, $L^3$, $L^5$, and $L^7$ may each independently be —C(=O)NH—, $L^4$, $L^6$, and $L^8$ may each independently be a C1 to C10 alkylene group, and a, b, c, d, e, and f may be an integer of 1.

The sulfonate group-containing structural unit may include one of a structural unit represented by Chemical Formula 5, a structural unit represented by Chemical Formula 6, and a structural unit represented by Chemical Formula 7 or two or more thereof. For example, the sulfonate group-containing structural unit may include a structural unit represented by Chemical Formula 6 or for another example the sulfonate group-containing structural unit may include a structural unit represented by Chemical Formula 6 and a structural unit represented by Chemical Formula 7.

The sulfonate group-containing structural unit may be for example a unit derived from vinyl sulfonic acid, allyl sulfonic acid, styrene sulfonic acid, anethole sulfonic acid, acryl amidoalkane sulfonic acid, sulfoalkyl (meth)acrylate, or a salt thereof.

Herein, the alkane may be C1 to C20 alkane, C1 to C10 alkane, or C1 to C6 alkane and the alkyl may be C1 to C20 alkyl, C1 to C10 alkyl, or C1 to C6 alkyl. The salt refers to a salt consisting of the sulfonic acid and an appropriate ion. The ion may be for example an alkali metal ion and in this case, the salt may be an alkali metal sulfonate salt.

The acryl amidoalkane sulfonic acid may be for example 2-acrylamido-2-methylpropane sulfonic acid and the sulfoalkyl (meth)acrylate may be for example 2-sulfoethyl (meth)acrylate, 3-sulfopropyl (meth)acrylate, and the like.

The sulfonate group-containing structural unit may be included in an amount of 0.1 mol % to 20 mol %, for example 0.1 mol % to 10 mol %, for example 1 mol % to 20 mol %, for example 1 mol % to 10 mol % based on the acrylic heat-resistant binder. When the sulfonate group-containing structural unit is included within the ranges, the acrylic heat-resistant binder and the separator 10 including the same may exhibit improved adherence, heat resistance, air permeability, and oxidation resistance.

As described above, the acrylic heat-resistant binder may include an alkali metal. The alkali metal may be present in a cation state and may be for example lithium, sodium, potassium, rubidium, or cesium. For example, the alkali metal may be bound to the acrylic heat-resistant binder and may be present in a form of a salt. The alkali metal may assist a synthesis of the acrylic heat-resistant binder in aqueous solvents, improve adherence of the heat-resistant layer 30, and improve heat resistance, air permeability, and oxidation resistance of the separator 10.

The alkali metal may be included in an amount of 1 wt % to 40 wt %, for example 1 wt % to 30 wt %, or 1 wt % to 20 wt %, or 10 wt % to 20 wt % based on a total weight of the alkali metal and the acrylic heat-resistant binder. For example, the acrylic heat-resistant binder and the alkali metal may be included in a weight ratio of 99:1 to 60:40, a weight ratio of 99:1 to 70:30, for example a weight ratio of 99:1 to 80:20, for example a weight ratio of 90:10 to 80:20.

The alkali metal may be included in an amount of 0.1 mol % to 1.0 mol % based on a total amount of the alkali metal and the acrylic heat-resistant binder.

When the alkali metal is included within the ranges, the heat-resistant layer 30 may have improved adherence and the separator 10 including the same may exhibit excellent heat resistance, air permeability, and oxidation resistance.

The acrylic heat-resistant binder may be represented by Chemical Formula 8.

[Chemical Formula 8]

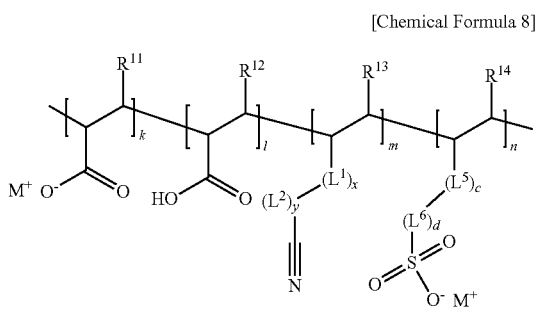

In Chemical Formula 8, $R^{11}$ and $R^{12}$ are each independently hydrogen or a methyl group, $R^{13}$ and $R^{14}$ are each independently hydrogen or a C1 to C3 alkyl group, $L^1$ and $L^5$ are each independently —C(=O)—, —C(=O)O—, —OC(=O)—, —O—, or —C(=O)NH—, $L^2$ and $L^6$ are each independently a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, x, y, c, and d are each independently an integer ranging from 0 to 2, M is an alkali metal such as lithium, sodium, potassium, rubidium, cesium, or the like, and k, l, m, and n represent the mole ratios of each structural unit.

For example, in Chemical Formula 8,
k+l+m+n=1.

For example, $0.1 \le (k+1) \le 0.5$, $0.4 \le m \le 0.85$, and $0.001 \le n \le 0.2$, for example $0.1 \le k \le 0.5$ and $0 \le l \le 0.25$.

For example, in Chemical Formula 8,
x=y=0, $L^5$ may be —C(=O)NH—, $L^6$ may be a C1 to C10 alkylene group, and c=d=1.

In the acrylic heat-resistant binder, a substitution degree of the alkali metal ($M^+$) may be about 0.5 to about 1.0, for example about 0.6 to about 0.9, or about 0.7 to about 0.9 relative to (k+n). When the substitution degree of the alkali metal satisfies the ranges, the acrylic heat-resistant binder and the separator 10 including the same may exhibit excellent adherence and heat resistance, and oxidation resistance.

The acrylic heat-resistant binder may further include other structural units in addition to the aforementioned structural units. For example, the acrylic heat-resistant binder may further include a structural unit derived from alkyl(meth)acrylate, a structural unit derived from a diene-based monomer, a structural unit derived from a styrene-based monomer, an ester group-containing structural unit, a carbonate group-containing structural unit, or a combination thereof.

The acrylic heat-resistant binder may have various forms, that is, an alternate polymer where the structural units are alternately distributed, a random polymer the units are randomly distributed, or a graft polymer where a portion of structural units is grafted.

A weight average molecular weight of the acrylic heat-resistant binder may be 200,000 g/mol to 700,000 g/mol, for example 200,000 g/mol to 600,000 g/mol, for example 300,000 g/mol to 600,000 g/mol. When the weight average molecular weight of the acrylic heat-resistant binder satisfies the ranges, the acrylic heat-resistant binder and the separator 10 including the same may exhibit excellent adherence, heat resistance, air permeability, and oxidation resistance. The weight average molecular weight may be polystyrene-reduced average molecular weight measured by gel permeation chromatography.

A glass transition temperature of the acrylic heat-resistant binder may be 200° C. to 280° C., for example 210° C. to 270° C., for example 210° C. to 260° C. When the glass transition temperature of the acrylic heat-resistant binder satisfies the ranges, the acrylic heat-resistant binder and the separator 10 including the same may exhibit excellent adherence, heat resistance, air permeability, and oxidation resistance. The glass transition temperature is measured by differential scanning calorimetry.

The acrylic heat-resistant binder may be prepared by a solution polymerization method and formed into a film as described above and thus included in the heat-resistant layer 30.

Hereinafter, the adhering binder included in the heat-resistant layer 30 is described.

In the separator according to an embodiment, the adhering binder is water soluble and may be a copolymer including a structural unit including a structural unit including hydroxyl group, a structural unit including an acetate group, and a structural unit including an alkali metal.

The structural unit including the hydroxyl group may be a structural unit derived from polyvinyl alcohol or a derivative of polyvinyl alcohol, and for example the adhering binder may be a binder including modified polyvinyl alcohol including acrylic acid.

The structural unit including the acetate group may be a structural unit derived from polyvinyl acetate or a structural unit derived from a derivative of polyvinyl acetate.

On the other hand, the structural unit including the alkali metal may be a structural unit derived from an alkali metal bound to a (meth)acrylate salt or a derivative of (meth)acrylate salt, which is represented by Chemical Formula 2. The alkali metal may be for example lithium, sodium, potassium, rubidium, or cesium and as in the Chemical Formula 2 or Chemical Formula 9 described later, the alkali metal may be present in a cation form in the structural unit or the copolymer.

In the separator according to an embodiment, the adhering binder may be represented by Chemical Formula 9.

[Chemical Formula 9]

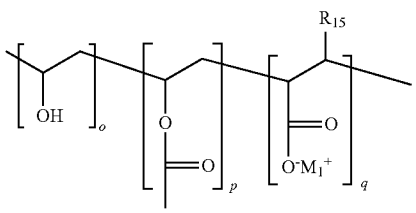

$R_{15}$ are each independently hydrogen or a C1 to C10 alkyl group, and $M_1$ is an alkali metal.

Herein, a mole ratio of the o:p:q may be in a range of 94:1:5 to 79:1:20, for example, 89:1:10 to 84:1:15, and o+p+q=100. When the mole ratio of the o, p, and q is the within the ranges, an appropriate viscosity is maintained, it is easy to be processed, and excellent solubility for water may not only be obtained, but a polymerization degree may also be increased.

In the separator according to an embodiment, the aforementioned acrylic heat-resistant binder functions for securing heat resistance in order to reduce a thermal shrinkage rate of the separator at a high temperature, and the adhering binder functions for securing adherence between the porous substrate 20 and the heat-resistant layer 30. The heat resistance and the adherence are properties having a trade-off relationship, and in an embodiment, the acrylic heat-resistant binder forms an acryl-based terpolymer and simultaneously, further includes the adhering binder and thus may realize a separator having excellent heat resistance and adherence to a substrate.

A weight average molecular weight of the adhering binder may be 50,000 g/mol to 1,000,000 g/mol, for example 150,000 g/mol to 750,000 g/mol, for example 250,000 g/mol to 450,000 g/mol. When the weight average molecular weight of the adhering binder satisfies the ranges, the adhering binder and the separator 10 including the same may exhibit excellent adherence, heat resistance, air permeability, and oxidation resistance. The weight average molecular weight may be polystyrene-reduced average molecular weight measured by gel permeation chromatography.

The acrylic heat-resistant binder and the adhering binder may be included in a weight ratio of 2:8 to 8:2, for example 5:5 to 8:2, for example 6:4 to 8:2. When the acrylic heat-resistant binder and adhering binder are included in the weight ratios, the separator 10 may exhibit excellent heat resistance, adherence, air permeability, and oxidation resistance.

The heat-resistant layer 30 may include a filler in addition to the acrylic heat-resistant binder and the adhering binder. The filler may further increase heat resistance and may prevent abrupt shrinkage or deformation of a separator due to increase of a temperature. The filler may be for example an inorganic filler, an organic filler, an organic/inorganic filler, or a combination thereof. The inorganic filler may be a ceramic material capable of improving heat resistance, for example a metal oxide, a semi-metal oxide, a metal fluoride, a metal hydroxide, or a combination thereof. The inorganic filler may be for example $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, or a combination thereof, but is not limited thereto. The organic filler may include an acrylic compound, an imide compound, an amide compound, or a combination thereof, but is not limited thereto. The organic filler may have a core-shell structure, but is not limited thereto.

The filler may have a spherical shape, sheet-shape, cubic-shape, or amorphous shape. An average particle diameter of the filler may range about 1 nm to 2500 nm, within the range 100 nm to 2000 nm, or 200 nm to 1000 nm, for example about 300 nm to 800 nm. The average particle diameter of the filler may be particle size ($D_{50}$) at a volume ratio of 50% in a cumulative size-distribution curve. By using the filler having an average particle diameter within the ranges, the heat-resistant layer 30 may have an appropriate strength, and the separator 10 may have improved heat resistance, durability, and stability. The filler may be used by mixing two or more different types of fillers or two or more fillers having different sizes.

The filler may be included in amount of 50 wt % to 99 wt %, for example 70 wt % to 99 wt %, for example 75 wt % to 99 wt %, for example 80 wt % to 99 wt %, for example 85 wt % to 99 wt %, for example 90 wt % to 99 wt %, for example 95 wt % to 99 wt % based on a total amount of the heat-resistant layer 30. When the filler is included within the ranges, the separator 10 for a secondary battery according to an embodiment may exhibit excellent heat resistance, durability, oxidation resistance, and stability. If the filler is not included within the content range, the thermal shrinkage rate of separator 10 may be significantly decreased.

In addition, the heat-resistant layer 30 may further include a non-cross-linkable binder in addition to the first acryl-based binder and the adhering binder. The non-cross-linkable binder may be for example a vinylidene fluoride-based polymer, polymethylmethacrylate, polyacrylonitrile, polyvinyl pyrrolidone, polyvinyl acetate, a polyethylene-vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxylmethyl cellulose, an acrylonitrile-styrene-butadiene copolymer, or a combination thereof, but is not limited thereto.

The vinylidene fluoride-based polymer may be specifically a homopolymer including only vinylidene fluoride monomer-derived structural unit or a copolymer of a vinylidene fluoride-derived structural unit and other monomer-derived structural units. The copolymer may specifically include a vinylidene fluoride-derived structural unit and at least one of structural units derived from chlorotrifluoroethylene, trifluoroethylene, hexafluoropropylene, ethylene tetrafluoride and ethylene monomers, but is not limited thereto. For example, the copolymer may be a polyvinylidene fluoride-hexafluoropropylene (PVdF-HFP) copolymer including a vinylidene fluoride monomer-derived structural unit and a hexafluoropropylene monomer-derived structural unit.

For example, the non-cross-linkable binder may be a polyvinylidene fluoride (PVdF) homopolymer, a polyvinylidene fluoride-hexafluoropropylene (PVdF-HFP) copolymer, or a combination thereof. In this case, adherence between the porous substrate 20 and the heat-resistant layer 30 is increased, stability of the separator 10 and impregnation properties of an electrolyte solution are improved, and thus high-rate charge and discharge characteristics of a battery are improved.

The heat-resistant layer 30 may have a thickness of about 0.01 μm to 20 μm, within the range, about 1 μm to 10 μm, or about 1 μm to 5 or about 1 μm to 3 μm.

A ratio of a thickness of the heat-resistant layer 30 relative to a thickness of the porous substrate 20 may be 0.05 to 0.5, for example 0.05 to 0.4, or 0.05 to 0.3, or 0.1 to 0.2. When the porous substrate 20 and the heat-resistant layer 30 have a thickness ratio within the ranges, the separator 10 including them may exhibit excellent air permeability, heat resistance, and adherence.

The separator 10 for a secondary battery according to an embodiment has excellent heat resistance. Specifically, the separator 10 may have a thermal shrinkage rate of less than or equal to 30%, for example less than or equal to 10%. For example, after the separator 10 is allowed to stand at 150° C. for 60 minutes, each thermal shrinkage rate of the separator 10 may be less than or equal to 30%, for example less than or equal to 10% in a machine direction (MD) and in a traverse direction (TD).

In general, in the separator 10, when the heat-resistant layer 30 is thick, a thermal shrinkage rate at a high temperature may be lowered. However, the separator 10 according to an embodiment may realize a thermal shrinkage rate at a high temperature of less than or equal to 30%, for example less than or equal to 10% even if a thickness of the heat-resistant layer 30 is 1 μm to 5 μm, or 1 μm to 3 μm.

In addition, the separator 10 for a secondary battery according to an embodiment is not broken or deformed and its shape is stably maintained at a high temperature of greater than or equal to 200° C., for example 200° C. to 250° C.

The separator 10 for a secondary battery according to an embodiment may exhibit excellent air permeability, and specifically less than 200 sec/100 cc, for example less than or equal to 190 sec/100 cc, or less than or equal to 180 sec/100 cc. In other words, the air permeability may be less than 40 sec/100 cc·1 μm per unit thickness, for example less than or equal to 30 sec/100 cc·1 μm per unit thickness, or less than or equal to 25 sec/100 cc·1 μm per unit thickness. Herein, the air permeability refers to a time (seconds) until 100 cc of air passes through a unit thickness of the separator. The air permeability per unit thickness may be obtained by measuring air permeability with a respect to the entire thickness of the separator and then, dividing the air permeability by the thickness.

The separator 10 for a secondary battery according to an embodiment may be manufactured by known various methods. For example, the separator 10 for a secondary battery may be formed by coating a composition for forming a heat-resistant layer and drying the same on one surface or both surfaces of the porous substrate 20.

The composition for forming the heat-resistant layer may include the aforementioned acrylic heat-resistant binder, adhering binder, and filler and a solvent. The solvent is not particularly limited if the solvent may dissolve or disperse the acrylic heat-resistant binder, adhering binder, and filler. In an embodiment, the solvent may be an aqueous solvent including water, an alcohol, or a combination thereof, which is environmentally-friendly.

The coating may be, for example a spin coating, a dip coating, a bar coating, a die coating, a slit coating, a roll coating, an inkjet printing, and the like, but is not limited thereto.

The drying may be for example performed through natural drying, drying with warm air, hot air, or low humid air, vacuum-drying, or radiation of a far-infrared ray, an electron beam, and the like, but the present disclosure is not limited thereto. The drying may be for example performed at a temperature of 25° C. to 120° C.

The separator 10 for a secondary battery may be manufactured by lamination, coextrusion, and the like in addition to the above method.

Hereinafter, a lithium secondary battery including the separator 10 for the secondary battery is described.

A lithium secondary battery may be classified into a lithium ion battery, a lithium ion polymer battery, and a lithium polymer battery depending on kinds of a separator and an electrolyte. It also may be classified to be cylindrical, prismatic, coin-type, pouch-type, and the like depending on a shape. In addition, it may be bulk type and thin film type depending on sizes. Structures and manufacturing methods for these batteries pertaining to this disclosure are well known in the art.

Herein, as an example of a lithium secondary battery, a prismatic lithium secondary battery is for example described. FIG. 2 is an exploded perspective view showing a lithium secondary battery according to an embodiment. Referring to FIG. 2, a lithium secondary battery 100 according to an embodiment includes an electrode assembly 60 manufactured by interposing a separator 10 between a positive electrode 40 and a negative electrode 50 and winding them, and a case 70 housing the electrode assembly 60.

The electrode assembly 60 may have for example a jelly-roll shape formed by winding the positive electrode 40, the negative electrode 50, and the separator 10 disposed therebetween.

The positive electrode 40, the negative electrode 50, and the separator 10 are impregnated in an electrolyte solution (not shown).

The positive electrode 40 includes a positive current collector and a positive active material layer formed on the positive current collector. The positive active material layer includes a positive active material, a binder, and optionally a conductive material.

The positive current collector may use aluminum, nickel, and the like, but is not limited thereto.

The positive active material may use a compound being capable of intercalating and deintercalating lithium. Specifically, at least one of a composite oxide or a composite phosphate of a metal selected from cobalt, manganese, nickel, aluminum, iron, or a combination thereof and lithium may be used. For example, the positive active material may be a lithium cobalt oxide, a lithium nickel oxide, a lithium manganese oxide, a lithium nickel cobalt manganese oxide, a lithium nickel cobalt aluminum oxide, a lithium iron phosphate, or a combination thereof.

The binder improves binding properties of positive active material particles with one another and with a current collector, and specific examples may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto. These may be used alone or as a mixture of two or more.

The conductive material improves conductivity of an electrode. Examples thereof may be natural graphite, artificial graphite, carbon black, a carbon fiber, a metal powder, a metal fiber, and the like, but are not limited thereto. These may be used alone or as a mixture of two or more. The metal powder and the metal fiber may use a metal of copper, nickel, aluminum, silver, and the like.

The negative electrode 50 includes a negative current collector and a negative active material layer formed on the negative current collector.

The negative current collector may use copper, gold, nickel, a copper alloy, and the like, but is not limited thereto.

The negative active material layer may include a negative active material, a binder, and optionally a conductive material. The negative active material may be a material that reversibly intercalates/deintercalates lithium ions, a lithium metal, a lithium metal alloy, a material being capable of doping and dedoping lithium, a transition metal oxide, or a combination thereof.

The material that reversibly intercalates/deintercalates lithium ions may be a carbon material which is any generally-used carbon-based negative active material, and examples thereof may be crystalline carbon, amorphous carbon, or a combination thereof. Examples of the crystalline carbon may be graphite such as amorphous, sheet-shape, flake, spherical shape or fiber-shaped natural graphite or artificial graphite. Examples of the amorphous carbon may be soft carbon or hard carbon, a mesophase pitch carbonized product, fired coke, and the like. The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn. The material being capable of doping and dedoping lithium may be Si, $SiO_x$ ($0<x<2$), a Si—C composite, a Si—Y alloy, Sn, $SnO_2$, a Sn—C composite, a Sn—Y alloy, and the like, and at least one of these may be mixed with $SiO_2$. Specific examples of the element Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof. The transition metal oxide may be vanadium oxide, lithium vanadium oxide, and the like.

The binder and the conductive material used in the negative electrode 50 may be the same as the binder and conductive material of the positive electrode 40.

The positive electrode 40 and the negative electrode 50 may be manufactured by mixing each active material composition including each active material and a binder, and optionally a conductive material in a solvent, and coating the active material composition on each current collector.

Herein, the solvent may be N-methylpyrrolidone, and the like, but is not limited thereto. The electrode manufacturing method is well known, and thus is not described in detail in the present specification.

The electrolyte solution includes an organic solvent a lithium salt.

The organic solvent serves as a medium for transmitting ions taking part in the electrochemical reaction of a battery. Specific examples thereof may be selected from a carbonate-based solvent, an ester-based solvent, an ether-based solvent, a ketone-based solvent, an alcohol-based solvent, and an aprotic solvent. The carbonate-based solvent may be dimethylcarbonate, diethylcarbonate, dipropylcarbonate, methylpropylcarbonate, ethylpropylcarbonate, methylethylcarbonate, ethylenecarbonate, propylenecarbonate, butylenecarbonate, and the like, and the ester-based solvent may be methylacetate, ethylacetate, n-propylacetate, 1,1-dimethylethylacetate, methylpropionate, ethylpropionate, γ-butyrolactone, decanolide, valerolactone, mevalonolactone, caprolactone, and the like. The ether-based solvent may be dibutyl ether, tetraglyme, diglyme, dimethoxyethane, 2-methyltetrahydrofuran, tetrahydrofuran, and the like, and the ketone-based solvent may be cyclohexanone, and the like.

The alcohol-based solvent may be ethanol, isopropyl alcohol, and the like, and the aprotic solvent may be nitriles such as R—CN (R is a C2 to C20 linear or branched or cyclic hydrocarbon group, a double bond, an aromatic ring, or an ether bond), and the like, amides such as dimethyl formamide, dioxolanes such as 1,3-dioxolane, sulfolanes, and the like.

The organic solvent may be used alone or in a mixture of two or more, and when the organic solvent is used in a mixture of two or more, the mixture ratio may be controlled in accordance with a desirable cell performance.

The lithium salt is dissolved in an organic solvent, supplies lithium ions in a battery, basically operates the lithium secondary battery, and improves lithium ion transportation between positive and negative electrodes therein. Examples of the lithium salt may include $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x'+1}SO_2)(C_yF_{2y'+1}SO_2)$ (x' and y' are natural numbers), LiCl, LiI, $LiB(C_2O_4)_2$, or a combination thereof, but is not limited thereto.

The lithium salt may be used in a concentration ranging from 0.1 M to 2.0 M. When the lithium salt is included within the above concentration range, an electrolyte may have excellent performance and lithium ion mobility due to optimal electrolyte conductivity and viscosity.

MODE FOR INVENTION

Hereinafter, the above aspects of the present disclosure are illustrated in more detail with reference to examples. However, these examples are exemplary, and the present disclosure is not limited thereto.

Synthesis Example 1: Synthesis of Acrylic Heat-resistant Binder

Synthesis Example 1-1

Distilled water (968 g), acrylic acid (45.00 g, 0.62 mol), ammonium persulfate (0.54 g, 2.39 mmol, 1500 ppm based on monomers), 2-acrylamido-2-methylpropane sulfonic acid (5.00 g, 0.02 mol), and a 5 N sodium hydroxide aqueous solution (0.8 equivalent based on a total amount of the acrylic acid and the 2-acrylamido-2-methylpropane sulfonic acid) were put in a 3 L four-necked flask equipped with a stirrer, a thermometer, and a condensing tube, and after three times repetitively reducing an internal pressure in the flask into 10 mmHg with a diaphragm pump and recovering it into a normal pressure with nitrogen, acrylonitrile (50.00 g, 0.94 mol) was added thereto.

The reaction solution was controlled to have a stable temperature in a range of 65° C. to 70° C. and reacted for 18 hours, ammonium persulfate (0.23 g, 1.00 mmol, 630 ppm based on a monomer) was secondarily added thereto, and the obtained mixture was heated up to 80° C. and reacted again for 4 hours. After cooling the temperature down to room temperature, the reaction solution was adjusted to have pH in a range of 7 to 8 by using a 25% ammonia aqueous solution.

A poly(acrylic acid-co-acrylonitrile-co-2-acrylamido-2-methylpropane sulfonic acid) sodium salt was prepared in this method. The acrylic acid, the acrylonitrile, and the 2-acrylamido-2-methylpropane sulfonic acid were used in a mole ratio of 39:59:2. About 10 mL of the reaction solution (a reaction product) was taken to measure a non-volatile component, and the result was 9.0 wt % (a theoretical value: 10%).

Synthesis Example 1-2

An acryl-based copolymer was manufactured according to the same method as Synthesis Example 1 except for using acrylic acid (40 g, 0.56 mol), acrylonitrile (50 g, 0.94 mol), and 2-acrylamido-2-methylpropane sulfonic acid (10 g, 0.05 mol). The acrylic acid, the acrylonitrile, and the 2-acrylamido-2-methylpropane sulfonic acid were used in a mole ratio of 36:61:3. A non-volatile component of the reaction solution was 9.0 wt % (a theoretical value: 10%).

Synthesis Example 1-3

An acryl-based copolymer was manufactured according to the same method as Synthesis Example 1 except for using acrylic acid (35 g, 0.49 mol), acrylo nitrile (50 g, 0.94 mol), and 2-acrylamido-2-methylpropane sulfonic acid (15 g, 0.07 mol). The acrylic acid, the acrylonitrile, and the 2-acrylamido-2-methylpropane sulfonic acid were used in a mole ratio of 32:63:5. A non-volatile component of the reaction solution was 9.0 wt % (a theoretical value: 10%).

Synthesis Example 1-4

An acryl-based copolymer was manufactured according to the same method as Synthesis Example 1 except for using acrylic acid (30 g, 0.42 mol), acrylonitrile (50 g, 0.94 mol), and 2-acrylamido-2-methylpropane sulfonic acid (20 g, 0.10 mol). The acrylic acid, the acrylonitrile, and the 2-acrylamido-2-methylpropane sulfonic acid were used in a mole ratio of 28:65:7. A non-volatile component of the reaction solution was 9.0 wt % (a theoretical value: 10%).

Synthesis Example 1-5

An acryl-based copolymer was manufactured according to the same method as Synthesis Example 1 except for using acrylic acid (32 g, 0.49 mol), acrylonitrile (60 g, 1.13 mol), and 2-acrylamido-2-methylpropane sulfonic acid (5 g, 0.02 mol). The acrylic acid, the acrylonitrile, and the 2-acrylamido-2-methylpropane sulfonic acid were used in a mole ratio of 30:69:1. A non-volatile component of the reaction solution was 9.0 wt % (a theoretical value: 10%).

Synthesis Example 1-6

An acryl-based copolymer was manufactured according to the same method as Synthesis Example 1 except for using acrylic acid (30 g, 0.42 mol), acrylonitrile (60 g, 1.13 mol), and 2-acrylamido-2-methylpropane sulfonic acid (10 g, 0.05 mol). The acrylic acid, the acrylonitrile, and the 2-acrylamido-2-methylpropane sulfonic acid were used in a mole ratio of 26:71:3. A non-volatile component of the reaction solution was 9.0 wt % (a theoretical value: 10%).

Synthesis Example 1-7

An acryl-based copolymer was manufactured according to the same method as Synthesis Example 1 except for using acrylic acid (25 g, 0.35 mol), acrylonitrile (60 g, 1.13 mol), and 2-acrylamido-2-methylpropane sulfonic acid (15 g, 0.07 mol). The acrylic acid, the acrylonitrile, and the 2-acrylamido-2-methylpropane sulfonic acid were used in a mole ratio of 22:73:5. A non-volatile component of the reaction solution was 9.0 wt % (a theoretical value: 10%).

Synthesis Example 1-8

An acryl-based copolymer was manufactured according to the same method as Synthesis Example 1 except for using acrylic acid (20 g, 0.28 mol), acrylonitrile (60 g, 1.13 mol), and 2-acrylamido-2-methylpropane sulfonic acid (20 g, 0.10 mol). The acrylic acid, the acrylonitrile, and the 2-acrylamido-2-methylpropane sulfonic acid were used in a mole ratio of 18:75:7. A non-volatile component of the reaction solution was 9.0 wt % (a theoretical value: 10%).

Synthesis Example 2: Synthesis of Adhering Binder

Distilled water (1000 g), acrylic acid (36.03 g, 0.50 mol), and ammonium persulfate (0.54 g, 2.49 mmol, 500 ppm relative to a monomer) were put in a 3 L four-necked flask equipped with a stirrer, a thermometer, and a condensing tube, and vinyl acetate (172.18 g, 2.00 mol) and Dowfax2A1 (2 g) as an anion emulsifier were added thereto, and nitrogen was internally filled in the reactor.

The reaction solution was reacted for 12 hours, while controlled to have a stable temperature in a range of 65° C. to 70° C. The reaction solution was cooled down to room temperature, and a coagulant was added thereto to obtain a solid.

The obtained solid was dissolved in methanol (2 L) in a 3 L four-necked flask equipped with a stirrer, a thermometer, and a condensing tube, sodium hydroxide (100 g, 2.5 mol) was added to the solution, and nitrogen was filled inside the reactor.

The reaction solution was reacted for 2 hours, while controlled to have a stable temperature in a range of 40° C. to 45° C. The extracted solid was filtered and five times washed with methanol to obtain 190 g of a solid.

Comparative Synthesis Example 1

An acryl-based copolymer was manufactured according to the same method as Synthesis Example 1-1 except that acrylic acid (50 g, 0.69 mol) and acrylonitrile (50 g, 0.94 mol) were used and 2-acrylamido-2-methylpropane sulfonic acid was not used. The acrylic acid and the acrylonitrile were used in a mole ratio of 42:58. A non-volatile component of the reaction solution was 9.0 wt % (theoretical value: 10%).

Comparative Synthesis Example 2

An acryl-based copolymer was manufactured according to the same method as Synthesis Example 1 except for acrylic acid (50 g, 0.69 mol) and 2-acrylamido-2-methylpropane sulfonic acid (50 g, 0.24 mol) were used and acrylonitrile was not used. The acrylic acid and the acrylamido-2-methylpropane sulfonic acid were used in a mole ratio of 74:26. A non-volatile component of the reaction solution was 9.0 wt % (theoretical value: 10%).

Table 1 shows mole ratios, weight average molecular weights, and glass transition temperatures of monomers of each acryl-based copolymer according to Synthesis Examples 1-1 to 1-8 and Comparative Synthesis Examples 1 to 2.

TABLE 1

| | Mole ratio of monomers | | | Weight average molecular weight (g/mol) | Glass transition temperature (° C.) |
|---|---|---|---|---|---|
| | AA | AN | AMPS | | |
| Synthesis Example 1-1 | 39 | 59 | 2 | 310,000 | 280 |
| Synthesis Example 1-2 | 36 | 61 | 3 | 302,000 | 277 |
| Synthesis Example 1-3 | 32 | 63 | 5 | 304,000 | 275 |
| Synthesis Example 1-4 | 28 | 65 | 7 | 311,000 | 271 |
| Synthesis Example 1-5 | 30 | 69 | 1 | 285,000 | 265 |
| Synthesis Example 1-6 | 26 | 71 | 3 | 298,000 | 263 |
| Synthesis Example 1-7 | 22 | 73 | 5 | 305,000 | 232 |
| Synthesis Example 1-8 | 18 | 75 | 7 | 314,000 | 260 |
| Comparative Synthesis Example 1 | 42 | 58 | — | 320,000 | 278 |
| Comparative Synthesis Example 2 | 74 | — | 26 | 293,000 | 305 |

In Table 1, AA indicates acrylic acid, AN indicates acrylonitrile, and AMPS indicates 2-acrylamido-2-methylpropane sulfonic acid. The glass transition temperature was measured through a differential scanning calorimetry analysis.

Example 1: Manufacture of Separator for Secondary Battery

A composition for forming a heat-resistant layer was prepared by adding a binder obtained by mixing the acrylic heat-resistant binder (10 wt % in distilled water) according to Synthesis Example 1-1 and the adhering binder (a weight average molecular weight: 300,000 g/mol, a glass transition temperature: greater than or equal to 300° C.) according to Synthesis Example 2 in a mass ratio of 9:1, and boehmite (an average particle diameter: 600 nm, AOH60, Nabaltec) in a mass ratio of 1:30 to water as a solvent, milling the obtained mixture with a beads mill at 25° C. for 30 minutes, and adding water thereto to have a total solid content of 20 wt %. The composition was die-coated to be 3 μm thick respectively on both surfaces of a 12.5 μm-thick polyethylene porous substrate (permeability: 113 sec/100 cc, puncture strength: 360 kgf, SK) and dried at 70° C. for 10 minutes to manufacture a separator for a secondary battery.

Example 2

A separator for a secondary battery was manufactured according to the same method as Example 1 except that the acrylic heat-resistant binder (10 wt % in distilled water) according to Synthesis Example 1-1 and the adhering binder according to Synthesis Example 2 were used in a weight ratio of 7:3.

Example 3

A separator for a secondary battery was manufactured according to the same method as Example 1 except that the acrylic heat-resistant binder (10 wt % in distilled water) according to Synthesis Example 1-1 and the adhering binder (a weight average molecular weight: 300,000 g/mol, a glass transition temperature: greater than or equal to 300° C.) were used in a weight ratio of 5:5.

Example 4

A separator for a secondary battery was manufactured according to the same method as Example 1 except that the acrylic heat-resistant binder (10 wt % in distilled water) according to Synthesis Example 1-1 and the adhering binder (a weight average molecular weight: 300,000 g/mol, a glass transition temperature: greater than or equal to 300° C.) were used in a weight ratio of 3:7.

Example 5

A separator for a secondary battery was manufactured according to the same method as Example 1 except that the acrylic heat-resistant binder (10 wt % in distilled water) according to Synthesis Example 1-1 and the adhering binder (a weight average molecular weight: 300,000 g/mol, a glass transition temperature: greater than or equal to 300° C.) were used in a weight ratio of 1:9.

Example 6

A separator for a secondary battery was manufactured according to the same method as Example 2 except that the acryl-based polymer according to Synthesis Example 1-2 was used instead of the acryl-based polymer according to Synthesis Example 1-1.

Example 7

A separator for a secondary battery was manufactured according to the same method as Example 2 except that the acryl-based polymer according to Synthesis Example 1-3 was used instead of the acryl-based polymer according to Synthesis Example 1-1.

Example 8

A separator for a secondary battery was manufactured according to the same method as Example 2 except that the acryl-based polymer according to Synthesis Example 1-4 was used instead of the acryl-based polymer according to Synthesis Example 1-1.

Example 9

A separator for a secondary battery was manufactured according to the same method as Example 2 except that the acryl-based polymer according to Synthesis Example 1-5 was used instead of the acryl-based polymer according to Synthesis Example 1-1.

Example 10

A separator for a secondary battery was manufactured according to the same method as Example 2 except that the acryl-based polymer according to Synthesis Example 1-6 was used instead of the acryl-based polymer according to Synthesis Example 1-1.

Example 11

A separator for a secondary battery was manufactured according to the same method as Example 2 except that the acryl-based polymer according to Synthesis Example 1-7 was used instead of the acryl-based polymer according to Synthesis Example 1-1.

Example 12

A separator for a secondary battery was manufactured according to the same method as Example 2 except that the acryl-based polymer according to Synthesis Example 1-8 was used instead of the acryl-based polymer according to Synthesis Example 1-1.

Comparative Example 1

A composition for forming a heat-resistant layer was prepared by adding the acryl-based polymer (10 wt % in distilled water) according to Synthesis Example 1-1 and boehmite (an average particle diameter: 600 nm, AOH60, Nabaltec) in a mass ratio of 1:30 to a water solvent, milling the obtained mixture with a beads mill at 25° C. for 30 minutes, and adding water thereto to have a total solid content of 20 wt %. The composition for forming the heat-resistant layer was die-coated to be 3 μm thick on the cross section of a 12.5 μm-thick polyethylene porous substrate (permeability: 113 sec/100 cc, piercing strength: 360 kgf, SK) and then, dried at 70° C. for 10 minutes to manufacture a separator for a secondary battery.

Comparative Example 2

A separator for a secondary battery was manufactured according to the same method as Example 2 except that the acryl-based polymer of Comparative Synthesis Example 1 instead of the acryl-based polymer of Synthesis Example 1-1 was used.

Comparative Example 3

A separator for a secondary battery was manufactured according to the same method as Example 2 except that the acryl-based polymer of Comparative Synthesis Example 2 instead of the acryl-based polymer of Synthesis Example 1-1 was used.

Evaluation Example 1: Air Permeability

Each time (seconds) until 100 cc of air passed through each of the separators for a secondary battery according to Example 1 to Example 12 and Comparative Example 1 to Comparative Example 3 was measured by using a permeability measuring device (Asahi Seiko Co., Ltd., EG01-55-1MR), and the results are shown in Table 1.

Evaluation Example 2: Thermal Shrinkage Rate

The separators for a secondary battery according to Example 1 to Example 12 and Comparative Example 1 to Comparative Example 3 were respectively cut into a size of 8 cm×8 cm to prepare samples. The samples after drawing a 5 cm×5 cm-size quadrangle on the surface were inserted between paper or alumina powder, allowed to stand at 150° C. in an oven for 1 hour, and taken out of the oven, and each shrinkage rate between machine direction (MD) and in a traverse direction (TD) was calculated by measuring sides of the quadrangles drawn on the samples. The results are shown in Table 1.

Evaluation Example 3: Heat-Resistant Fracture

The separators for a secondary battery according to Examples 1 to 12 and Comparative Examples 1 to 3 were respectively cut into a size of 5 cm×5 cm to obtain samples, and then were respectively attached on a cardboard having a 4 cm×4 cm-sized hole by using a polyimide film and put in each oven heated up to 200° C., 230° C., and 250° C. The separators were taken out of the ovens after 10 minutes to examine whether or not the samples were fractured, when fractured, O was given, while when not fractured, X was given, and the results are shown in Table 2.

TABLE 2

| | Mole ratios of each monomer of acryl-based copolymer | | | Ratio of heat-resistant binder:adhering binder | Solid content of composition for forming a heat-resistant layer (wt %) | Mass ratio of acryl-based copolymer and boehmite | Thickness of heat-resistant layer (μm) | Air permeability of separator (sec/100 cc) | Thermal shrinkage rate of separator (%) | Heat-resistant fracture | | |
|---|---|---|---|---|---|---|---|---|---|---|---|---|
| | AA | AN | AM PS | | | | | | | 200° C. | 230° C. | 250° C. |
| Example 1 | 39 | 59 | 2 | 9:1 | 20 | 1:30 | 3 | 148 | MD: 2 TD: 1 | X | X | X |
| Example 2 | 39 | 59 | 2 | 7:3 | 20 | 1:30 | 3 | 127 | MD: 2 TD: 1 | X | X | X |
| Example 3 | 39 | 59 | 2 | 5:5 | 20 | 1:30 | 3 | 175 | MD: 2 TD: 1 | X | X | X |
| Example 4 | 39 | 59 | 2 | 3:7 | 20 | 1:30 | 3 | 175 | MD: 2 TD: 1 | X | X | X |
| Example 5 | 39 | 59 | 2 | 1:9 | 20 | 1:30 | 3 | 178 | MD: 2 TD: 1 | X | X | X |
| Example 6 | 36 | 61 | 3 | 7:3 | 20 | 1:30 | 3 | 151 | MD: 4 TD: 3 | X | X | X |

TABLE 2-continued

| | Mole ratios of each monomer of acryl-based copolymer | | | Ratio of heat-resistant binder:adhering binder | Solid content of composition for forming a heat-resistant layer (wt %) | Mass ratio of acryl-based copolymer and boehmite | Thickness of heat-resistant layer (μm) | Air permeability of separator (sec/100 cc) | Thermal shrinkage rate of separator (%) | Heat-resistant fracture | | |
|---|---|---|---|---|---|---|---|---|---|---|---|---|
| | AA | AN | PS | | | | | | | 200° C. | 230° C. | 250° C. |
| Example 7 | 32 | 63 | 5 | 7:3 | 20 | 1:30 | 3 | 137 | MD: 4 TD: 3 | X | X | X |
| Example 8 | 28 | 65 | 7 | 7:3 | 20 | 1:30 | 3 | 143 | MD: 4 TD: 3 | X | X | X |
| Example 9 | 30 | 69 | 1 | 7:3 | 20 | 1:30 | 3 | 142 | MD: 4 TD: 3 | X | X | X |
| Example 10 | 26 | 71 | 3 | 7:3 | 20 | 1:30 | 3 | 152 | MD: 4 TD: 3 | X | X | X |
| Example 11 | 22 | 73 | 5 | 7:3 | 20 | 1:30 | 3 | 143 | MD: 4 TD: 3 | X | X | X |
| Example 12 | 18 | 75 | 7 | 7:3 | 20 | 1:30 | 3 | 138 | MD: 4 TD: 3 | X | X | X |
| Comparative Example 1 | 39 | 60 | 1 | — | 20 | 1:30 | 3 | 141 | MD: >50 TD: >50 | ○ | ○ | ○ |
| Comparative Example 2 | 42 | 58 | — | 7:3 | 20 | 1:30 | 3 | 141 | MD: >50 TD: >50 | ○ | ○ | ○ |
| Comparative Example 3 | 74 | — | 26 | 7:3 | 20 | 1:30 | 3 | 158 | MD: >50 TD: >50 | ○ | ○ | ○ |

Referring to Table 2, the separators according to Examples 1 to 12 exhibited excellent air permeability of less than or equal to 178 sec/100 cc and a shrinkage rate of less than or equal to 4% at 150° C., but the separator according to Comparative Examples 1 to 2 exhibited similar air permeability to those of the separators according to Examples 1 to 12 but a deteriorated thermal shrinkage rate or heat resistant fracture as a result of evaluating heat resistance.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

The invention claimed is:

1. A separator for a secondary battery, comprising
a porous substrate and a heat-resistant layer disposed on at least one surface of the porous substrate,
wherein the heat-resistant layer comprises an acrylic heat-resistant binder, an adhering binder, and a filler,
the acrylic heat-resistant binder comprises a structural unit derived from (meth)acrylate or (meth)acrylic acid, a cyano group-containing structural unit, and a sulfonate group-containing a structural unit, and
the adhering binder is represented by Chemical Formula 9:

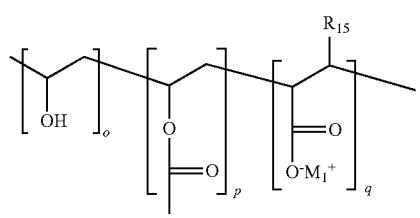

[Chemical Formula 9]

$R_{15}$ is independently hydrogen or C1 to C10 alkyl group,
$M_1$ is an alkali metal, and
a mole ratio of the o:p:q is 94:1:5 to 79:1:20.

2. The separator of claim 1, wherein the structural unit derived from (meth)acrylate or (meth)acrylic acid is represented by Chemical Formula 1, Chemical Formula 2, Chemical Formula 3, or a combination thereof:

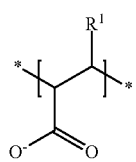

[Chemical Formula 1]

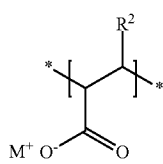

[Chemical Formula 2]

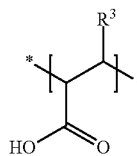

[Chemical Formula 3]

wherein, in Chemical Formula 1 to Chemical Formula 3,
$R^1$, $R^2$, and $R^3$ are each independently hydrogen or a methyl group,
wherein, in Chemical Formula 2,
M is an alkali metal.

3. The separator of claim 1, wherein the cyano group-containing structural unit is represented by Chemical Formula 4:

[Chemical Formula 4]

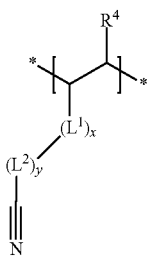

wherein, in Chemical Formula 4,

R$^4$ is hydrogen or a C1 to C1 alkyl group,

L$^1$ is —C(=O)—, —C(=O)O—, —OC(=O)—, —O—, or —C(=O)NH—, x is an integer ranging from 0 to 2, L$^2$ is a substituted or unsubstituted C1 to C10 alkylene group, a substituted or unsubstituted C3 to C20 cycloalkylene group, a substituted or unsubstituted C6 to C20 arylene group or a substituted or unsubstituted C3 to C20 heterocyclic group, and y is an integer ranging from 0 to 2.

4. The separator of claim 1, wherein the sulfonate group-containing structural unit is represented by Chemical Formula 5, Chemical Formula 6, Chemical Formula 7, or a combination thereof:

[Chemical Formula 5]

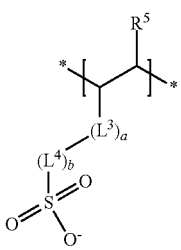

[Chemical Formula 6]

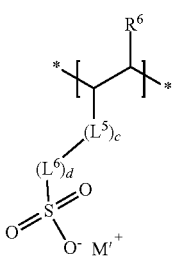

[Chemical Formula 7]

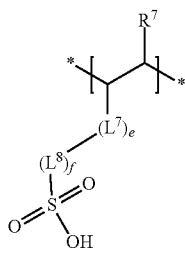

wherein, in Chemical Formula 5 to Chemical Formula 7,

R$^5$, R$^6$, and R$^7$ are each independently hydrogen or a C1 to C3 alkyl group, L$^3$, L$^5$, and L$^7$ are each independently —C(=O)—, —C(=O)O—, —OC(=O)—, —O—, or —C(=O)NH—, L$^4$, L$^6$, and L$^8$ are each independently a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, and a, b, c, d, e, and f are each independently an integer ranging from 0 to 2, wherein, in Chemical Formula 6, M' is an alkali metal.

5. The separator of claim 1, wherein
the acrylic heat-resistant binder comprises
20 mol % to 60 mol % of the structural unit derived from (meth)acrylate or (meth)acrylic acid;
30 mol % to 75 mol % of the cyano group-containing structural unit; and
0.1 mol % to 20 mol % of the sulfonate group-containing structural unit.

6. The separator of claim 1, wherein a weight average molecular weight of the acrylic heat-resistant binder is 200,000 g/mol to 700,000 g/mol.

7. The separator of claim 1, wherein a glass transition temperature of the acrylic heat-resistant binder is 200° C. to 280° C.

8. The separator of claim 1, wherein the acrylic heat-resistant binder further comprises an alkali metal.

9. The separator of claim 1, wherein the mole ratio of the o:p:q is 89:1:10 to 84:1:15.

10. The separator of claim 1, wherein a weight average molecular weight of the adhering binder is 50,000 g/mol to 1,000,000 g/mol.

11. The separator of claim 1, wherein the acrylic heat-resistant binder and the adhering binder are included in a weight ratio of 2:8 to 8:2.

12. A lithium secondary battery, comprising
a positive electrode,
a negative electrode, and
the separator for the secondary battery according to claim 1 disposed between the positive electrode and the negative electrode.

* * * * *